United States Patent [19]
Sonstroem

[11] Patent Number: 5,629,520
[45] Date of Patent: May 13, 1997

[54] LASER THREAT STATUS DETECTION

[75] Inventor: Jaime Sonstroem, Springfield, Va.

[73] Assignee: The United States of America as represented by the Secretary of the Army, Washington, D.C.

[21] Appl. No.: 559,857

[22] Filed: Nov. 20, 1995

[51] Int. Cl.⁶ .................................... G01J 5/06
[52] U.S. Cl. .................. 250/330; 250/347; 250/348
[58] Field of Search ............................ 250/348, 347, 250/330

[56] References Cited

U.S. PATENT DOCUMENTS 3,631,252  12/1971  Gebel .......................... 250/214 VT
4,909,609  3/1990  McDowell ........................ 359/241
4,914,287  4/1990  Savoca ............................ 250/216

*Primary Examiner*—Constantine Hannaher
*Attorney, Agent, or Firm*—Milton W. Lee; John E. Holford; Alain L. Bashore

[57] ABSTRACT

A system and technique to incorporate threat detectors within the FLIR's optical train and use the radiation reflected off of insertable protective filters, or a coated clear window, to determine if the threat is still present. If there has been some change in laser threat status then there is allowed the removal or insertion of the protective filter.

5 Claims, 3 Drawing Sheets

LASER THREAT STATUS DETECTION

BACKGROUND OF THE INVENTION

1. Field of the Invention

The present invention generally relates to electro-optical countermeasures and more specifically, to a technique and device for an automated determination of the laser threat status and the resulting insertion, retention, or removal of an appropriate filter in the forward looking infrared (FLIR) viewing devices' optical train.

2. Description of prior Art

The majority of current forward-looking infrared (FLIR) sensors are equipped with a filter wheel or sliding filter set for protecting the sensor from threat laser systems. The filters are mounted either in a rotating wheel or in a sliding mechanism, and in the best designs are tilted from the normal to reduce retroreflections. The filter sets normally are comprised of a "clear" filter which is normally in place, and several spectrally discriminating rejection filters. These filters are inserted under manual control by the operator (either slid into place with a sliding mechanism or rotated into place with a filter wheel) when the presence of a threat becomes apparent. One concern with the current schemes is how to determine when the laser threat status has begun, and when it is safe to remove the filter again. The use of the internal FLIR Focal Plane Array (FPA) for threat detection suffers from the serious pitfall that once a protective filter has been engaged, in most instances the system can no longer detect the threat.

While the prior art has reported using manual filter techniques none have established a basis for a specific apparatus that is dedicated to the task of resolving the particular problem at hand. What is needed in this instance is an automated determination of the laser threat status and the resulting insertion, retention, or removal of an appropriate filter in the FLIR's optical train.

SUMMARY OF THE INVENTION

It is therefore one object of the invention to provide a technique and system for an automated determination of the laser threat status and the resulting insertion, retention, or removal of an appropriate filter in the FLIR's optical train.

According to the invention, there is disclosed a system and technique for continued threat detection after the insertion of a protective filter, determining if the threat laser is still present, and therefor if a change of filter is required. There is utilized the reflected radiation off of the protecting filter which is detected by an Infrared-sensitive detector. Presence of radiation above a certain pre-defined threshold causes the filter to be retained. Use of two or more spectrally discriminating threat detectors allows recognition of a change in the threat wavelength and immediate change to the corresponding protective filter. Reduction of radiation below a certain pre-defined threshold causes a return to the unfiltered position.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
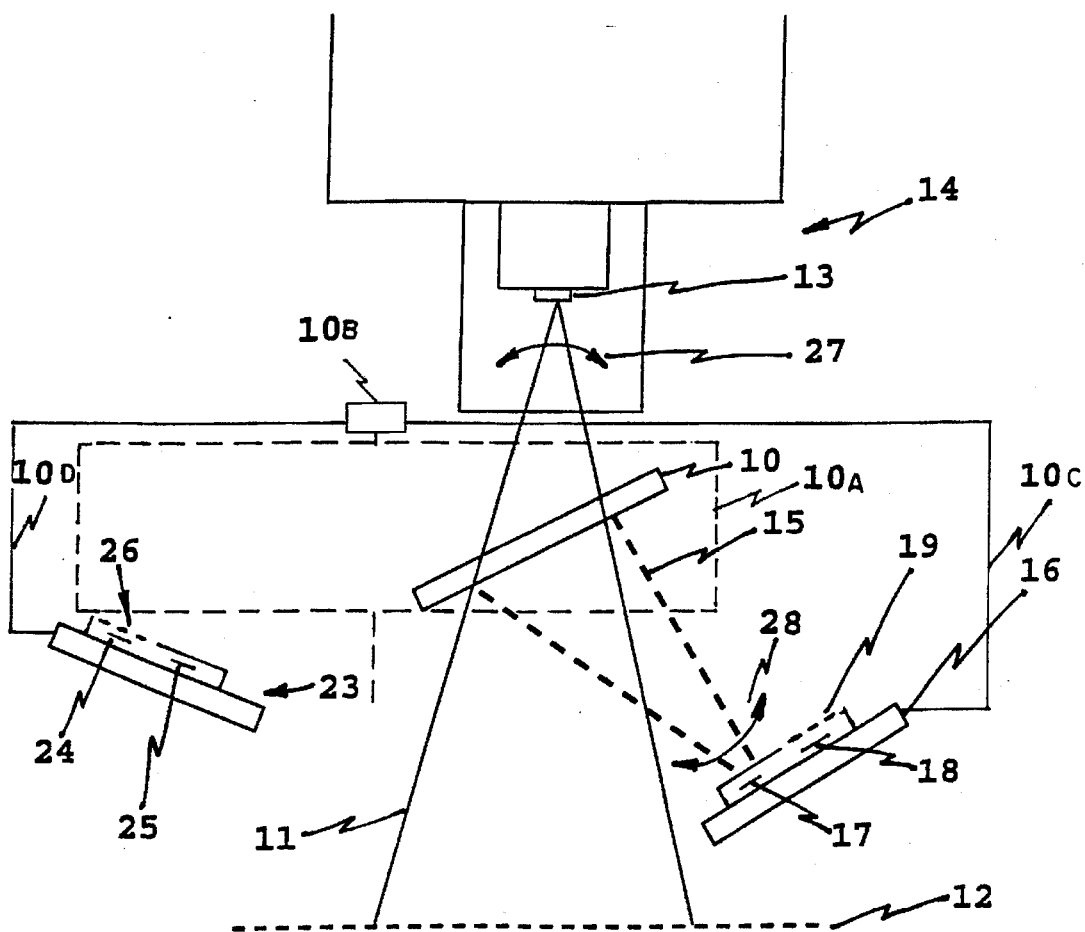
FIG. 1 is a top view diagram of the system of the invention positioned within a FLIR's optical train for a laser non-threat status in a non-filtered condition.

Referring now to the drawings, and more particularly to FIG. 1, there is shown a top view diagram of the system of the invention positioned within a FLIR's optical train for a laser non-threat status in a non-filtered condition. Optic element 10 is an anti-reflection (AR) coated window, with an optical thickness equal to that of other filters to be utilized. Optic element 10 is an optic that eliminates the need for refocusing the FLIR in going from a non-filtered position to a filtered position. The "clear" filter is tilted to minimize retroreflections and position within holding means 10a which houses alternative filters. Moving means 10b with feedback lines 10c and 10d is shown as the servo mechanism for moving the clear filter and other filters into and out of position. Infrared radiation 11 enters from the front imaging optics at location 12 and is focused on the detector FPA 13, which is housed within the detector/dewar unit 14. A small amount of this radiation, however, is also reflected off of optic element 10 as reflected radiation 15, and is focused at an off-axis position forward of the filter insertion means to threat detector assembly 16. Threat detector assembly 16 has two discrete detector elements 17 and 18. Each detector is made to discriminate a different wavelength band by use of the dual-band filter 19.

Figure 2:
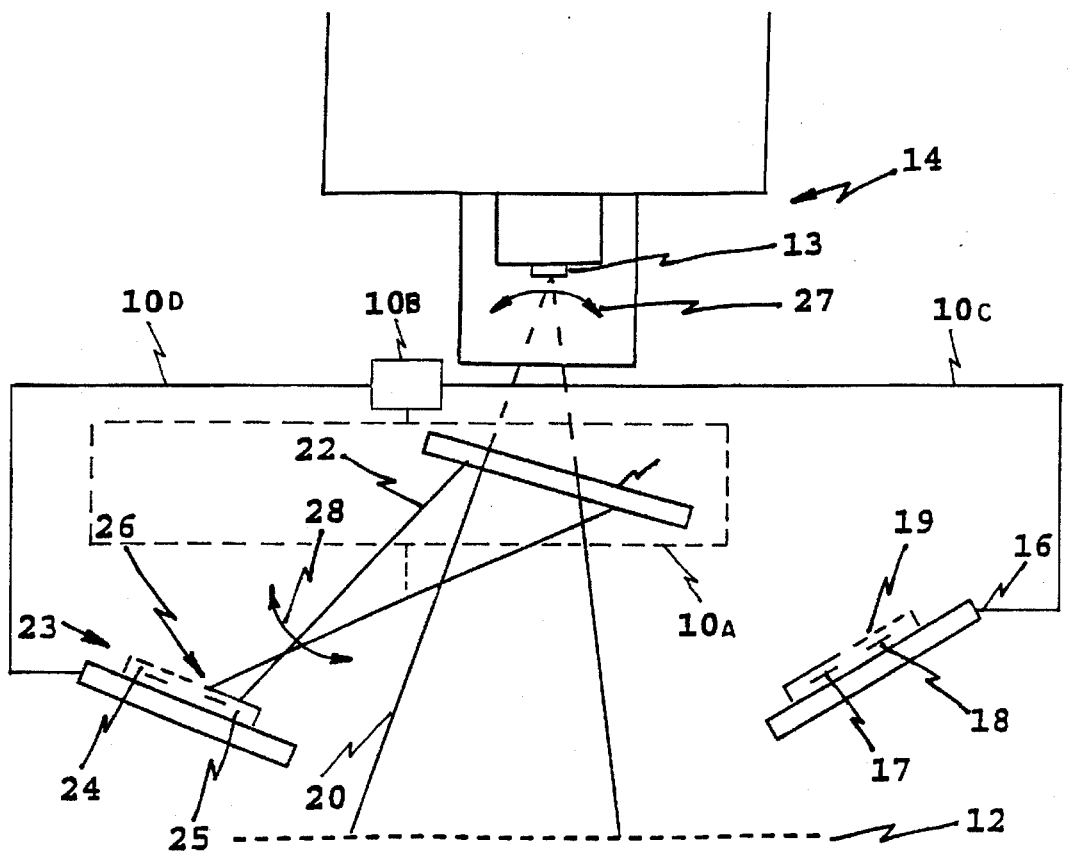
FIG. 2 is a top view diagram of the system of the invention positioned within a FLIR's optical train for a laser threat status in a filtered condition.

FIG. 2 is a top view diagram of the system of the invention positioned within a FLIR's optical train for a laser threat status in a filtered condition. Infrared radiation 20 enters from the front imaging optics at location 12 and is normally focused on the detector FPA 13, which is housed within the detector/dewar unit 14. In this filter-protected configuration, however, more than 99% of the laser energy is reflected off of filter 21 as reflected radiation 22, and is focused at an off-axis position forward of the filter insertion means to threat detector assembly 23. Filter 21 is one of multiple filters including filters which all are held in holding means 10a. It is understood that the invention is not limited to a particular holding means, but that any equivalent alternative means may be used. Threat detector assembly 23 includes two discrete detector elements 24 and 25. Each detector is made to discriminate a different wavelength band by use of the dual-band filter 26. Decrease of radiation below a pre-defined threshold would initiate a return to the pre-filtered state shown in FIG. 1. Since nearly all of the laser energy is being reflected towards the threat detectors, they should be placed well out of focus to minimize the power density or energy density. In addition, a neutral density filter may be placed above dual band filter 26 for further protection.

Figure 3:
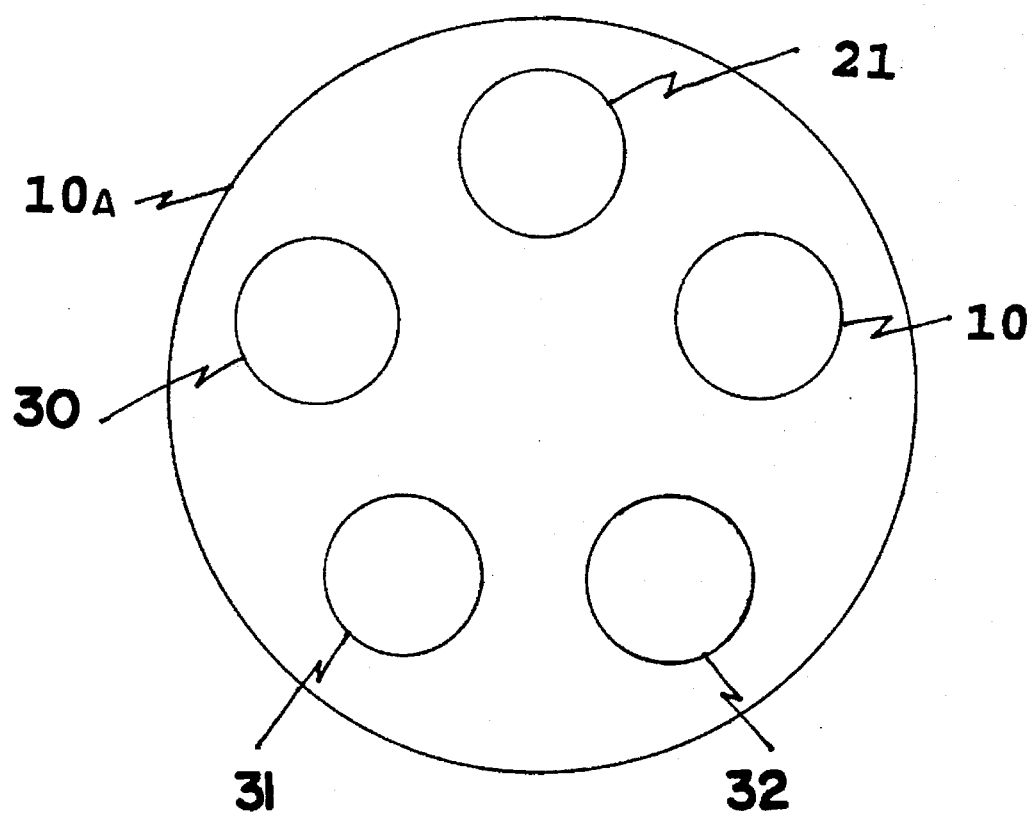
FIG. 3 is a front view of the filter wheel utilized in the preferred embodiment.

The number of detector elements and discriminatory filter bands are generally made to match the protective filter set. For example, a protective filter set may be comprised of four filters: a clear filter, a filter which blocks from 9–10 microns, a filter which blocks from 10–11 microns, and a filter which blocks from 9–11 microns. In this case the threat detection scheme would include 2 threat detectors, one behind a 9–10 micron bandpass filter, and the other behind a 10–11 micron bandpass filter. If either threat detector sensed radiation above a certain pre-defined threshold, the appropriate complementary filter would be inserted by the filter insertion means in an acceptable time frame. Means for moving clear filter 10 and filters including filter 21 into and out of position in the preferred embodiment is filter wheel 10a shown in FIG. 3. Filters 30, 31, and 32 are other filters positioned within filter wheel 10a. If both detectors intermittently sensed radiation above a certain threshold, this would indicate an agile threat, and the 9–11 micron filter would be inserted. For a different combination of filters in the protective filter set, the number and filtering of the threat detectors would be set accordingly. In addition, different methods of implementing the wavelength sensitivity of the threat detectors could be used.

To be most sensitive, the threat detectors should be placed close to the indicated focal plane; however, they should be several millimeters out of focus, and at an angle of approximately 30 degrees to the incoming radiation to minimize retroreflections. The detectors should be of a material which is fairly sensitive in the Far IR, but which is also resistant to laser damage. Since the radiation is being scanned across the detectors in scanning directions 27, a threat detector type which requires an AC signal can be used, such as a pyroelectric or ferroelectric detector. The detection circuitry should be capable of handling either pulsed or continuous wave (CW) laser sources. The threat detectors can be relatively thin in scan directions 28, but should be made of such a length so as to match the FPA length, which corresponds to the vertical field of view (FOV) of the FLIR system. The invention could also be applied to work with visible or near-infrared systems which are equipped with protective filters.

The protective filters are canted in a direction opposite the clear window. This allows use of the two threat detectors assemblies, one of which is nearly in focus (but sees a small percentage of the incoming radiation) and the other intentionally out of focus (as it sees nearly 100% of the incoming radiation. This opposite canting will cause the image to shift laterally as dictated by geometrical optics, and therefore a boresight adjustment must be performed by the FLIR electronics. An alternate scheme would have all filters canted in the same direction and use a single threat detector assembly. In this case the design can either ignore the desired focal shift, or achieve this in another manner, such as with a mechanical shift of the focus position of the threat detector assembly which occurs simultaneously with the filter insertion.

A 1 mm thick zinc selenide optical element with a conventional dielectric stack AR coating is in place within a FLIR with a common module 60 element FPA. First and second detector assemblies utilized are both linear pyroelectric detector strips. Each is multispectral, with one detector strip filtered to observe the 10–11 micron band, and the other filtered to observed the 9–10 micron band. The first detector assembly is placed 2 mm out of focus from the reflected focal plane of the clear filter, and is tilted at a 30 degree angle from this optical bundle. The second detector assembly is place 50 mm out of focus from the reflected focal plane of the protective filters, and is tilted at a 30 degree angle from its optical bundle. A corresponding filter wheel is used with the following scheme: filter 1: clear; filter 2: 1—1 micron blocker; filter 3: 9–10 micron blocker; filter 4: 9–11 micron blocker. The filter wheel is motorized, allowing insertion of the correct filter within 0.2 seconds. A voltage peak detector monitors the output of the threat detectors, looking for a voltage level greater than 8 times the noise voltage. A conventional servo mechanism responsive to the predetermined wavelength band according to a preselected frequency.

A 10.6 micron continuous wave $CO_2$ laser beam with power densities of 1 microwatt/$cm^2$ or greater at the FLIR aperture is detected as a laser threat by the first threat detector assembly's 10–11 μm detector, reflected from the clear optical element. The appropriate protective filter, which in this case is a 10–11 micron blocking dielectric stack fitter with appropriate optical deetiny is switched in. All laser-protection filters are canted in a direction opposite to that of the clear filter, thus sparing the more sensitive configuration first detector assembly from full intensity illumination, and directing this illumination to the second detector assembly which is farther out of focus, and also protected by a fixed neutral destiny filter of optical density, and is therefore a much more robust and laser-hardened detector assembly.

The present invention operates when the system is in its filter-protected state to determine the current laser threat status and used when the system is in its non-filter-protected configuration to initially determine when a filter should be inserted and which filter to insert. This would remove the burden of threat detection entirely from the FPA, and not require any "external" threat detection scheme. The advantage over using the external threat detectors is that the proposed scheme can also be customized to match the Field-of-View (FOV) of the FLIR. The length of the threat detector elements can be made to match the vertical FOV of the FLIR, and thus would only trigger a filter insertion when the FLIR FPA was threatened. The relatively high optical gain at this location would also make this approach much more sensitive than the external approach, and since it is behind the scanner, would allow use of a detector which requires an AC signal. The advantages over the external threat detection approach are therefore a matched FOV, superior sensitivity, and intrinsic scanning, allowing a broader choice of detector materials. All of these advantages will act to lessen the rate of false alarms, or for a given false alarm rate, to increase threat detection sensitivity by more than two orders of magnitude.

While this invention has been described in terms of preferred embodiment consisting of a specific system, those skilled in the art will recognize that the invention can be practiced with modification within the spirit and scope of the appended claims.

Having thus described my invention, what I claim as new and desire to secure by Letters Patent is as follows:

1. A system for laser threat status detection and protection from incoming radiation received within an optical train of a forward looking infrared (FLIR) system comprising:

a focal plane array detector within the FLIR system for the detection of incoming infrared radiation, as incoming radiation;

a means, positioned within the optical train, for reflecting at least a portion of the incoming radiation as reflected radiation;

at least two alternative means, selectively positioned within the optical train, for filtering wavelength bands of incoming radiation and reflecting a portion thereof, as reflected radiation, with each alternative filtering means functioning to filter a different wavelength band;

a means for moving each of said alternative filtering means, and said means for reflecting, in accordance with the wavelength of the reflected radiation, into and out of the optical train;

at least two alternative means, positioned outside the optical train, for detecting the reflected radiation, each alternative means for detecting, detects a wavelength band that which is filtered by the alternative filtering means, whereby when the reflected radiation is detected as below a pre-defined threshold, the means for moving each of said alternative filtering means, and means for reflecting, in accordance with the wavelength of the reflected radiation, into and out of the optical train would move the means for reflecting at least a portion of the incoming IR radiation as reflected IR radiation into the optical train, and when the reflected IR radiation is detected as above a pre-defined threshold, the means for moving each of said alternative filtering means, and means for reflecting, in accordance with the wavelength of the reflected radiation, into and out of the optical train would move the alternative means for filtering wavelength bands of incoming radiation and reflecting a portion thereof into the optical path thereby filtering the detected wavelength band.

2. The system of claim 1 wherein the means for reflecting at least a portion of the incoming radiation as incoming radiation is an anti-reflection coated clear window.

3. The system of claim 1 wherein the alternative means for filtering wavelength bands of incoming radiation and reflecting a portion thereof, each is a dielectric stack filter.

4. The system of claim 1 wherein means for moving each of said alternative filtering means, and said means for reflecting, in accordance with the wavelength of the reflected radiation, into and out of the optical train, is a servo mechanism responsive to each alternative means for detecting each filtered wavelength band of each alternative means for filtering wavelength bands of incoming radiation and reflecting a portion thereof, which activates a motorized filter wheel.

5. The system of claim 1 wherein the alternative means for detecting the reflected radiation is each including linear pyroelectric detector strips.

* * * * *